United States Patent
Watt

(10) Patent No.: US 7,213,065 B2
(45) Date of Patent: May 1, 2007

(54) SYSTEM AND METHOD FOR DYNAMIC SERVER ALLOCATION AND PROVISIONING

(75) Inventor: Charles T. Watt, Atlanta, GA (US)

(73) Assignee: Racemi, Inc., Atlanta, GA (US)

(*) Notice: Subject to any disclaimer, the term of this patent is extended or adjusted under 35 U.S.C. 154(b) by 653 days.

(21) Appl. No.: 10/290,171

(22) Filed: Nov. 8, 2002

(65) Prior Publication Data

US 2003/0126202 A1 Jul. 3, 2003

Related U.S. Application Data

(60) Provisional application No. 60/331,122, filed on Nov. 8, 2001.

(51) Int. Cl.
  *G06F 15/173* (2006.01)
  *G06F 15/177* (2006.01)
  *G06F 9/44* (2006.01)
(52) U.S. Cl. ............... 709/223; 709/220; 717/170
(58) Field of Classification Search .................. None
  See application file for complete search history.

(56) References Cited

U.S. PATENT DOCUMENTS

| | | | |
|---|---|---|---|
| 6,453,426 B1 * | 9/2002 | Gamache et al. | 714/4 |
| 6,618,805 B1 * | 9/2003 | Kampe | 713/1 |
| 6,898,705 B2 * | 5/2005 | Abboud et al. | 713/100 |
| 2001/0032239 A1 * | 10/2001 | Sashino et al. | 709/203 |
| 2002/0052941 A1 * | 5/2002 | Patterson | 709/223 |
| 2002/0161863 A1 * | 10/2002 | McGuire | 709/220 |
| 2003/0009657 A1 * | 1/2003 | French et al. | 713/2 |
| 2005/0125212 A1 * | 6/2005 | Hunt et al. | 703/21 |

* cited by examiner

Primary Examiner—Wen-Tai Lin
(74) Attorney, Agent, or Firm—DLA Piper US LLP

(57) ABSTRACT

A management tool that streamlines the server allocation and provisioning processes within a data center is provided. The system, method, and computer program product divide the server provisioning and allocation into two separate tasks. Provisioning a server is accomplished by generating a fully configured, bootable system image, complete with network address assignments, virtual LAN (VLAN) configuration, load balancing configuration, and the like. System images are stored in a storage repository and are accessible to more than one server. Allocation is accomplished using a switching mechanism which matches each server with an appropriate system image based upon current configuration or requirements of the data center. Thus, real-time provisioning and allocation of servers in the form of automated responses to changing conditions within the data center is possible. The ability to instantly re-provision servers, safely and securely switch under-utilized server capacity to more productive tasks, and improve server utilization is also provided.

41 Claims, 7 Drawing Sheets

SYSTEM AND METHOD FOR DYNAMIC SERVER ALLOCATION AND PROVISIONING

This application claims priority from U.S. Provisional Application Ser. No. 60/331,122, filed Nov. 8, 2001. The entirety of that provisional application is incorporated herein by reference.

BACKGROUND OF THE INVENTION

1. Field of the Invention

The present invention relates generally to computer resource management systems and methods, and more particularly to systems and methods that provide dynamic, load-based allocation and provisioning of servers within data centers.

2. Related Art

In today's computing environment, it is common for an entity (e.g., a corporation) to operate a data center to provide a variety of applications and services for its customer end users and internal operations. Such data centers typically include a collection of servers, storage elements (i.e., any device designed and built primarily for the purpose of persistent data storage and delivery), and a communications infrastructure (i.e., a network) that provides physical connections among the data center's elements and a management layer that organizes these connections, storage elements and servers.

Each application or service to be executed within the data center often requires one or more servers provisioned with the correct operating system, middleware, application software, data and configuration information. Currently, provisioning and allocating a server are essentially one task—installing the necessary software onto the hard drive of the server and configuring it for use within the specific application and operating environment.

More specifically, the provisioning process for a traditional server involves installing and configuring software on the server's directly attached storage device or dedicated storage area network (SAN) device. This is a time consuming, mostly manual operation that can take days to complete and fully verify for a large, complex application. It is also a destructive process that requires irreversible changes to the server's disk drive such that any previous installation will be overwritten. If the new installation fails, there may be no easy way to recover the previous working system. The time, effort, expense and risk associated with provisioning servers make it infeasible to re-provision a server to meet short-term requirements. Thus, in practice, each server typically is statically allocated to a specific application.

Several commercial tools have been introduced that streamline this process when installing a large number of servers. These tools employ "push provisioning" to copy a system image over the network to the local hard drive of each server. This approach is useful in maintaining a common system image across a server pool, but does not facilitate rapid re-provisioning of servers because it consumes significant network bandwidth and is destructive of previous installations. Re-provisioning a single server can fully saturate a 100 Mbps local area network (LAN) for several minutes. Re-provisioning a pool of servers can take several hours.

As mentioned above, because of the time, effort, expense and risk associated with provisioning servers, each server in the data center typically is statically allocated to a specific application. Consequently, long-term capacity projections are used to plan server capacity in advance of need to ensure that the data center has sufficient number of servers to meet the peak capacity requirements for each application. Most of the time, however, an application does not experience peak demand and its servers run well below their capacity. This wastes power and physical (i.e., rack) space, as well as increases administrative burden.

Therefore, given the above, what is needed is a system, method, and computer program product for dynamic server allocation and provisioning. The system, method, and computer program product should divide the server provisioning and allocation into two separate tasks. Provisioning a server should be accomplished by generating a fully configured, bootable system image (root file system, kernel, applications, data, etc.), complete with network address assignments, virtual LAN (VLAN) configuration, load balancing configuration, and the like. The system images should be stored in a storage repository such that they are accessible to more than one server. The allocation process should be accomplished using a switching mechanism that can match each server with an appropriate system image based upon the current configuration or requirements of the data center. Thus, the system, method, and computer program product should be able to provide real-time provisioning and allocation of servers in the form of automated responses to changing conditions within the data center.

SUMMARY OF THE INVENTION

The present invention meets the above-identified needs by providing a system, method and computer program product for dynamic server allocation and provisioning.

In an embodiment, the present invention includes a storage element for storing server images available for loading onto servers within a data center, a load manager capable of assigning one of the server images (i.e., a root file system, kernel, and one or more applications) to each of the servers, and at least one server manager for each of the servers capable of powering it on and off upon receiving commands from the load manager. The present invention also includes boot loaders residing on the servers and capable of receiving commands from the server managers in order to load the server images onto each of the servers. Such loading, in an embodiment, involves each server accessing only those portions of the image needed at any point in time and can incrementally load additional portions of the image on an as-needed basis.

The present invention further includes a server monitor that receives periodic heartbeat and load measurement signals from each of the servers in the data center via a communications network. These signals are then reported to the load manager. This allows the load manager to allocate and provision servers upon detecting failures (i.e., lack of heartbeat signals from a particular server in the data center). This also allows the load manager to allocate and provision servers according to pre-determined criteria in response to the load measurement signals received from the servers.

In alternate embodiments, the present invention includes a boot controller capable of exchanging messages (e.g., DHCP messages) with each of the boot loaders in order to assist the boot loaders in loading server images onto each of their servers. Such assistance includes resolving which instance of a server image to load and the server's network configuration. Also included is a repository manager that manages the aggregation of application software snapshots in order to form various server images, which are then stored in a repository (i.e., any of a variety of storage elements such as a storage area network (SAN) device, a network attached storage (NAS) device or a distributed file system (DFS)) thereby making them available for loading onto the servers. A control console, having a graphical user interface (GUI), is also provided for allowing a user (i.e., a data center administrator) to create various server images and perform various other administrative, reporting and billing functions, including defining the pre-determined criteria for the load manager to implement during server provisioning and allocation.

An advantage of the present invention is that it lowers capital costs for an entity operating a data center containing multiple servers. By sharing servers across the entity's customers and applications, massive improvements in server utilization are gained. This translates directly into the need for fewer servers, fewer racks, less floor space, less supporting infrastructure, less power and less cooling. This also translates directly into multiple revenue streams per server (i.e., when a server is under-utilized, it can be switched to an alternate revenue stream).

Another advantage of the present invention is that it lowers operational costs by automating the provisioning and software management tasks. That is, a significant reduction of administrative burden associated with an entity's servers within a data center can be realized. This results in the ability to reduce administrative staff or can free existing staff for more productive activities.

Yet another advantage of the present invention is that its load monitoring and automated server allocation and provisioning features allow an entity to provide customers with guaranteed service level agreements (SLAs) that can be reliably enforced without adding additional hardware to the data center or adding additional staff to its operation.

Yet another advantage of the present invention is that its facilitates detailed accounting and reporting to allow an entity to bill customers based upon their actual server usage, to enforce variable rate pricing for peak, off-peak and overload conditions to maximize returns and helps to attract new customers to the entity's data center.

Yet another advantage of the present invention is that it reduces an entity's overall operational risk typically associated with data center operations. As a result of maintaining server images on centralized storage, the present invention vastly simplifies backup processes, making it quicker, more efficient, and more reliable. The real-time server allocation and provisioning features allow an entity to quickly rebuild a data center in the event of a disaster. An N×M fault-tolerance allows a single pool of M servers to provide full disaster backup for any number of N applications or data centers. (For example, M spare servers can provide a back up for N servers possibly executing N different applications, and where N>>M.) Application performance and server health are continuously monitored. Thus, in the event of poor application performance or a server or network failure, additional server capacity can be powered on and provisioned, rerouting the network as necessary.

Yet still another advantage of the present invention is improved infrastructure security. The provisioning system of the present invention utilizes read-only file systems that cannot be modified by data center servers. This helps prevent inadvertent or malicious corruption of the servers. Many network security issues are eliminated by automatically configuring the network infrastructure when a server is provisioned to restrict access to just those resources within the data center that the server needs to perform its function.

Further features and advantages of the invention as well as the structure and operation of various embodiments of the present invention are described in detail below with reference to the accompanying drawings.

DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

I. Overview

Figure 1:
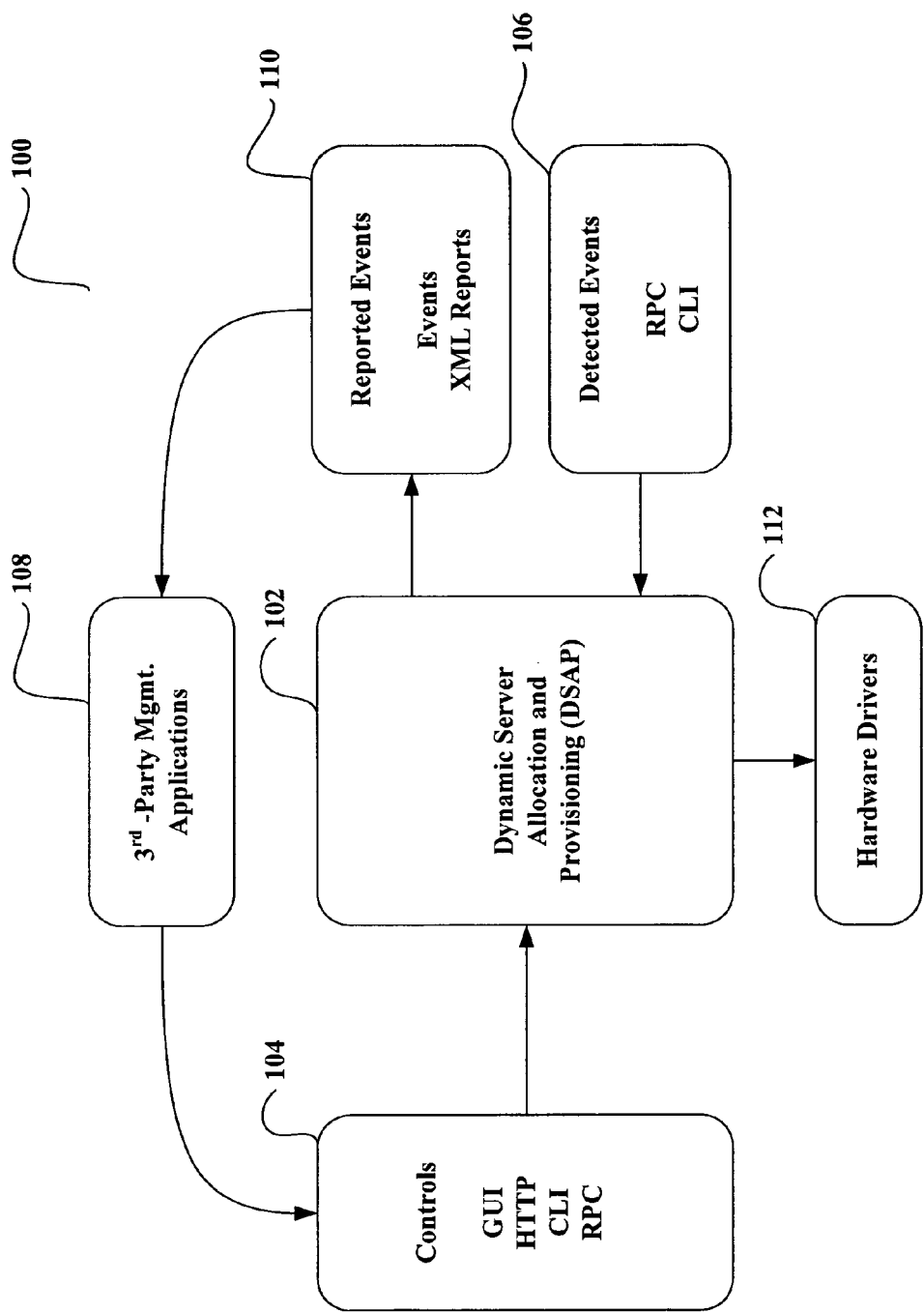
FIG. 1 is a block diagram illustrating the integration of an embodiment of the present invention into a conventional data center.

The present invention provides a system, method and computer program product for dynamic server allocation and provisioning.

Running a data center is a complex operation that requires clean integration between a variety of management and monitoring applications and tools. Thus, in an embodiment, an entity running such a data center will utilize the management tool of the present invention to perform: (i) automated software management and provisioning (i.e., software installation, configuration, patches, upgrades, rollbacks, and full life-cycle maintenance); (ii) real-time allocation (including powering servers on/off as needed, and automatic network infrastructure reconfiguring); (iii) scheduled allocation (i.e., swapping servers back and forth between multiple applications based upon date, time-of-day, day-of-week and/or the like); (iv) server monitoring (e.g., continuous monitoring for server failures or server pool under- or over-load conditions); (v) automated, policy-based allocation (i.e., management of server pools, a cluster of resources, or the entire data center for complete "lights-out" operation); and (vi) accounting (i.e., recording detailed accounting trails of all server usage for viewing and generating reports for billing, monitoring, tracking, allocation, and resource planning).

The present invention is now described in more detail herein in terms of the above example. This is for convenience only and is not intended to limit the application of the present invention. In fact, after reading the following description, it will be apparent to one skilled in the relevant art(s) how to implement the following invention in alternative embodiments. For example, the present invention can dynamically provision and allocate any computer systems or other processing systems including servers, desktop computers, personal computers, handheld computing devices, or dedicated or special purpose systems, where these processing systems can be jointly located within a data center environment, deployed individually, or any combination thereof. Further, in alternate embodiments, the present invention can dynamically provision and allocate servers, including virtual servers that run within a partition of a server's hardware or operating system such as those offered by IBM's Logical Partitions (LPAR) and Virtual Machine (VM), Sun's Dynamic System Domains (DSD), and Hewlett-Packard's nPartition or vPartition.

The terms "user," "entity," "administrator," and the plural form of these terms may be used interchangeably throughout herein to refer to those who would access, use, and/or benefit from the tool that the present invention provides for dynamic server allocation and provisioning.

Further, the term "loading" as used herein with reference to loading server images onto servers from a storage element means that a server need only access those portions of the image needed at any point in time and can incrementally load additional portions of the image on an as-needed basis. Alternately, a server may choose to pre-load the entire image into its local storage.

II. System Integration

Referring to FIG. 1, a block diagram 100 illustrating the integration of an embodiment of the present invention into an existing data center infrastructure is shown. More specifically, FIG. 1 illustrates the variety of interfaces in one embodiment of the present invention's dynamic server allocation and provisioning ("DSAP") system 102. The interfaces are designed to provide easy, fully functional integration with other data center operations and management applications.

DSAP system 102 can be controlled using its powerful, easy-to-use management interface, command line utilities and scripts, or direct network commands. Each event that it monitors and each action that it takes can be easily extended or modified using its unique callout capability. It provides feedback and alarms to the data center's network operations center and provide custom policies and controls. The interfaces are described in more detail below.

Commands and controls 104 can be sent to DSAP system 102 using a graphical user interface (GUI), Hypertext Transfer Protocol (HTTP) commands, a Command Line Interface (CLI), or a native Remote Procedure Call (RPC) mechanism.

Third-party applications 108 can report DSAP system-related events 106, such as a server failure or a server pool overload, using DSAP system 102 CLI or RPC mechanisms. DSAP system 102 reports events using an event publishing mechanism 110. This allows a third-party application 108 to register with event publisher mechanism 110 to receive notification of interesting events, such as server failure, server pool overload, administrator login, the creation of a new virtual service for load balancing, and the like. Event handlers within event publishing mechanism 110 can tie DSAP system 102 events back to the third-party applications 108. The event handlers can also alter the flow of the core processing of DSAP system 102. This can be used for "advanced" purposes such as replacing the authentication mechanism of DSAP system 102, providing automated firewall management, replacing standard server allocation algorithms of DSAP system 102, and the like. Event publishing mechanism 110 can produce reports in Extensible Markup Language (XML) so that they can be easily integrated with existing billing and resource management tools.

DSAP system 102 provides driver application programming interfaces (APIs) for interacting with various hardware drivers 112 such as hardserver blade chassis, server power controllers, network switches, and network load balancers.

III. Overview of System Architecture

Figure 2:
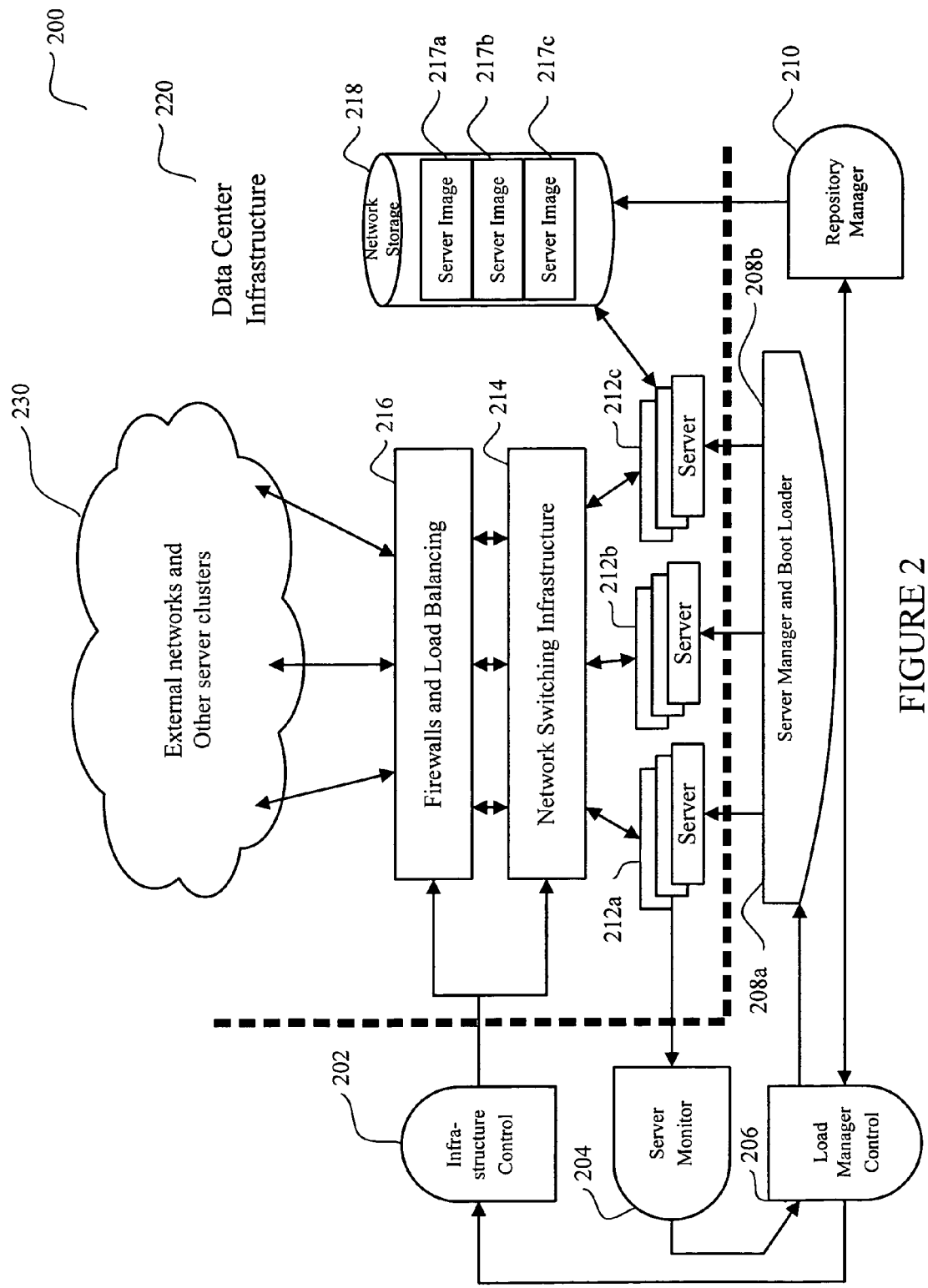
FIG. 2 is a block diagram illustrating the system architecture of an embodiment of the present invention, showing connectivity among the various components.

Referring to FIG. 2, a block diagram illustrating the (logical) system architecture of an embodiment of the present invention, showing connectivity among the various components, is shown. More specifically, FIG. 2 illustrates the components of DSAP system 102 and their respective connectivity to conventional data center components 220 to form a data center 200 according to an embodiment of the present invention.

The components of DSAP system 102, in an embodiment, include an infrastructure controller 202, a server monitor 204, a load manager 206, a plurality of server managers 208a and a plurality of corresponding boot loaders 208b, and a repository manager 210.

Conventional data center components 220 include a plurality of server pools 212a–n, where each pool 212 contains several servers (e.g., an IBM™ or compatible computer running the Microsoft® Windows NT™ operating system, a Sun Fire™ server running the Solaris™ operating system or the like). Conventional data center components 220 also include network switching infrastructure 214, firewalls and load balancing infrastructure 216 (which are connected to external networks (e.g., the Internet) and external server clusters 230), and a centralized network storage device 218.

While one network storage device 218 is shown in FIG. 2 for ease of explanation, it will be apparent to one skilled in the relevant art(s) that in alternate embodiments data center 200 may utilize storage devices physically located on one or more computers and device 218 can be mirrored for fault tolerance.

Repository manager 210 is responsible for securely and efficiently provisioning and managing server images 217a–n on storage devices 218 within data center 200. It allows an administrator to install software one time such that it can be shared by all servers within a server pool 212, or even by servers in different pools. The administrator can pick and choose from the installed software base to create a master server image 217. Once defined, this server image 217 can be rapidly replicated and configured using automated tools to build out images for an entire server pool 212. Full life-cycle management is provided with easy patching, upgrades, and rollbacks.

Each server manager 208a is responsible for rebooting or powering on and off specified servers as directed by load manager 206. (Only one server manager 208a is shown in FIG. 2 for ease of explanation herein.) Boot loader 208b executes on the server under control. (Only one boot loader 208b is shown in FIG. 2 for ease of explanation herein.) Boot loader 208b directs the booting server to the correct system image 217, whether on centralized storage 218 or the particular server's local disk drive. After the server has booted to a fully operational state, server manager 208a maintains a management connection with the server via the server's console port or a secured network connection.

Server monitor 204 continuously monitors the health, load and response time of all servers within data center 200. It detects and reports server failures to load manager 206. Server monitor 204 also calculates average server load and response times for each configured server pool 212, reporting under- and over-load conditions to load manager 206.

Load manager 206 is responsible for allocating servers and images 217 to meet the requirements of data center 200. It receives reports on server failures and load conditions for servers within a server pool 212, and makes allocation decisions based upon rules and policy settings specified by the administrator. Load manager 206 powers servers on or off as needed via the server manager 208a. Load manager 206 re-provisions servers when needed via the repository manager 210. Load manager 206 reconfigures the network infrastructure 214 and 216 surrounding a server via infrastructure controller 202.

Load manager 206 can provide fully automated server allocation in conjunction with the other DSAP system 102 components. It also supports manual (via a control console) provisioning and allocation as well as scheduled allocation. Load manager 206 writes accounting records to a database each time a server is allocated or powered on or off. These records form the input to accounting and reporting modules which provide detailed resource tracking and billing as well as reporting on resource allocation, utilization, and efficiency.

Infrastructure controller 202 is responsible for configuring the network infrastructure 214 and 216 surrounding a server to provide secure, limited access to those resources required by the server and its applications. This includes configuring network switches and virtual LANs (VLANs) 216. The tasks of infrastructure controller 202 also include configuring load balancers 216 to add/remove servers from the affected server pools 212, configuring all switch ports connected to the server to ensure that the server and its applications have access to the network resources they need, and to prevent them from accessing any restricted resources that they are not authorized to access.

In an embodiment, infrastructure controller 202 is necessary only when the servers and applications within the data center 200 are partitioned using VLANs or hard-wired partitions. In such networks, infrastructure controller 202 serves to separate servers and their applications for reasons of security and isolates network traffic in order to improve overall throughput.

A control console (not shown in FIG. 2) provides the administrative interface by which data center personnel can create server images 217, manage the software repository, manually allocate servers and images 217, set the control parameters by which servers are automatically provisioned and allocated, and monitor the status of the data center 200. It is also provides accounting and reporting functions (and stores accounting records) to assist in customer billing and long-term resource planning. In an embodiment, the control console of DSAP system 102 also provides a Command Line Interface (CLI) as well as a Graphical User Interface (GUI) in order to accomplish the above-described functionality.

IV. Detailed System Architecture

The components of DSAP system 102 (i.e., components 202–210) shown in FIG. 2 are shown as logical (software) units in one embodiment of the present invention. Thus, as will be apparent to one skilled in the relevant art(s), it is possible to combine one or more of these components into a single component without departing from the spirit of the present invention. In an embodiment, components 202–206, 208a, and 210) may reside on a dedicated management workstation (either the same or different than the control console). In such an embodiment, multiple management workstations can be used to provide redundancy.

The components of DSAP system 102, as well as their functionality, are now described in more detail below.

A. Repository Manager

Repository manager 210 provides a methodology and toolset for laying out server images 217 on network storage element 218 (e.g., a network attached storage (NAS)), greatly reducing the complexity and cost of administering large numbers of servers. Repository manager 210 supports full life cycle management of the server image, providing easy patches, upgrades, and rollbacks. In an alternate embodiment, repository manager 210 can also install and manage instances on a SAN as well as on a server's local attached storage.

In an embodiment of the present invention, DSAP system 102 includes a repository which is a file hierarchy spread over one or more NAS 218 devices that contains all of the working server images 217a–n for the servers in data center 200, as well as all of the software, data, and support required to create and maintain those images.

Figure 3:
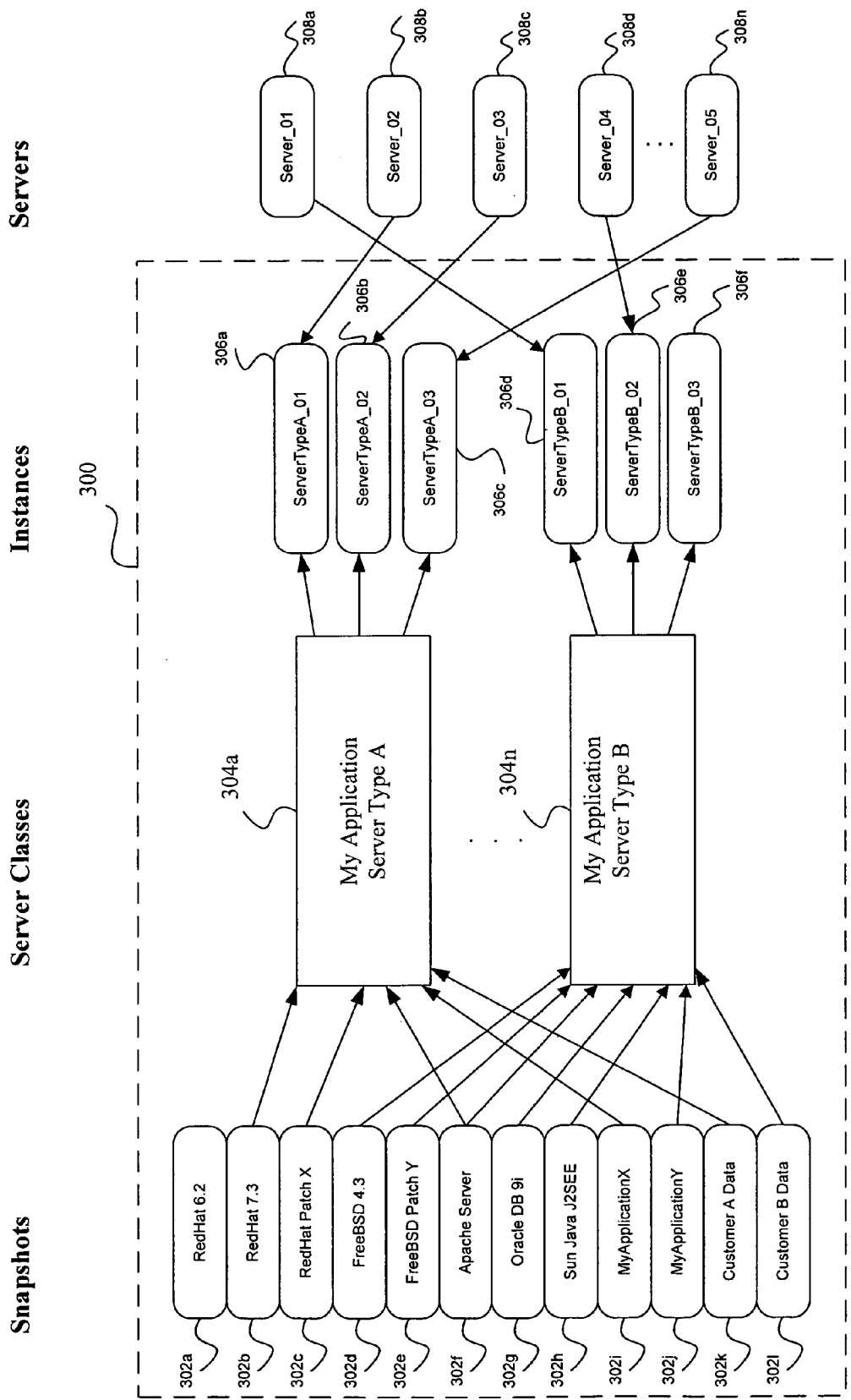
FIG. 3 is a block diagram of a repository according to an embodiment of the present invention.

Referring to FIG. 3, a block diagram of a repository 300 and its connection to the servers within a data center 200, according to an embodiment of the present invention, is shown. Repository manager 210 automates the building of repository 300 and virtualizes storage across multiple NAS devices 218. In an embodiment, from the perspective of the data center 200 administrator, there is just one repository 300 regardless of the number and types of storage devices 218 on which it is stored.

In an embodiment, software to be executed is installed only once, regardless of how many servers will eventually execute the software. This master installation is called a "snapshot" (FIG. 3 shows snapshots 302a–n representing several different installed software applications for execution on various servers 308a–n within the data center 200).

Software snapshots 302 can be combined to create a "golden master" server image 217, called a "server class" 304 (FIG. 3 shows server classes 304a–n). Each server class 304 is a list of snapshots 302 that eventually make up the specific image 217 or "personality" of a server 308.

Server images 217 are generated in an automated manner from a server class 304. A working server image 217 is called an "instance" 306 of the server class 304. When a server 308 boots, it mounts an instance 306 as its root file system, providing it with a "personality." Each server 308 can execute just one instance 306 at a time. Each instance 306 can be mounted by only one server 308 at a time. However, there is no limit to the number of instances 306 that can be created from a server class 304 and made available to a server pool 212.

In an embodiment, if any software within an instance 306 requires individual server licenses instead of a group or site license, the licenses are installed when the instance 306 is created. Further, simple patches and updates can be installed directly into the appropriate snapshot 302, immediately updating all server images 217 referencing the snapshot 302. To install more complex patches and updates, however, a new server class 304 that includes the original image plus the patch is first created, then the required number of instances 306 is created, and finally the servers 308 are switched to the new instances 306. In such an embodiment, because the original instances 306 are maintained intact, any necessary rollbacks can occur within seconds.

B. Boot Loader

When a traditional server powers up, it first runs a boot loader program that finds and loads its system image from its hard drive or other locally attached storage. In order for DSAP system 102 to properly function, however, it must be possible for it to dynamically alter the system image loaded by the servers in data center 200. According to the present invention, this may be accomplished in many ways.

In one embodiment, the boot loader of server 308 is replaced with a DSAP system-specific boot loader (e.g., a DSAP-specific boot loader stored in the flash memory of the server 308). In an alternate embodiment, the boot loader of server 308 is configured to load a DSAP system-specific boot loader in place of a server image. It can load the DSAP system's boot loader from the server's local storage, a floppy disk or CD-ROM, or over a communications network. In yet another embodiment, the behavior of the boot loader of server 308 can be controlled via commands issued by a serial line or other communications channel such that the boot loader is instructed to load the DSAP system's selected system image. In another embodiment, the SAN routing and volume assignment can be changed by DSAP system 102 thereby affecting the SAN's mapping of the server's SAN connection to a SAN volume. In yet another embodiment, the cabling, network connections, or routing by which a server 308 gains access to its storage can be dynamically switched by DSAP system 102.

The present invention is now described in more detail herein in terms of the above embodiment where the boot loader of each server 308 is replaced with a DSAP system-specific boot loader. This is for convenience only and is not intended to limit the application of the present invention. In fact, after reading the following description, it will be apparent to one skilled in the relevant art(s) how to implement the following invention in alternative embodiments.

The DSAP system 102 boot loader 208b first communicates with the server's assigned server manager 208a in order to learn the server's unique ServerID and other configuration details. In an embodiment, this communication can be via the server's serial console port, a network connection, or any other communications channel shared by the server 308 and its manager 208a. Boot loader 208b then identifies the system resources available on the server 308—CPU type and speed, available memory, hardware extensions, etc.—and sends this information to the DSAP system 102 boot controller as vendor-specific options in a Dynamic Host Configuration Protocol (DHCP) request. In an embodiment, the boot controller is a software component that resides on the control console.

Upon receiving the boot request, the DSAP system 102 boot controller uses the ServerID to resolve the proper instance 306 and network configuration for the server 308, and returns the information in a DHCP response. Prior to powering on the server 308 and starting the boot sequence, load manager 206 will have specified this information based upon the available server resources, the current load averages in the server pools 212, the images 217 currently available, and the operational requirements of data center 200. In alternate embodiments, the selected image 217 can reside on NAS 218, SAN, or a bootable partition on the local storage of server 308.

Boot loader 208b receives the response, loads the specified image 217, mounts the specified root file system, and passes control to the operating system of the image 217.

If boot loader 208b of a server 308 is unable to communicate with its server manager 208a, perhaps because no communications mechanism is provided between the two at boot time, the boot loader will quickly time out and go directly to the boot controller. The boot controller will detect the missing ServerID and map the server to an ID based upon the MAC address associated with the server's network interface. This mapping will be available if the data center 200 administrator has previously registered the server and its MAC address. If no mapping is found, the boot controller will not respond to the server 308 and it will fall back to its standard behavior (i.e., the behavior it would exhibit if no DSAP system 102 was present).

If boot loader 208b fails to receive a response from the boot controller, it will retry the process several times on all available network interfaces. If it still does not receive a response, it will fail over to the standard boot loader of the server 308 and the server 308 will boot in a standard way (i.e., as if no DSAP system 102 was present). Note that in the absence of the boot controller of DSAP system 102, all servers will boot as if DSAP system 102 were not installed within the data center 200.

In an embodiment, all DSAP system 102 components are independent of server type except for boot loader 208b, which is a software program that is unique to the server's processor family, network interface, and console interface. Supporting a new server hardware family requires the creation of a boot loader program written specifically for that family. In an embodiment, DSAP system 102 supports at least servers based on the Intel Pentium® and Sun SPARC™ processor families.

In an embodiment, by default, DSAP system 102 boot controller will only answer DHCP requests that originate from a DSAP system 102 boot loader 208b. Thus, it will not interfere with any other DHCP servers that are present within data center 200.

C. Server Manager

Server manager 208a is responsible for powering a server 308 on or off upon the command of load manager 206. It works closely with the boot loader 208b to ensure that each server 308 loads the correct image 217 when powered up, and to ensure that the server 308 shuts down gracefully before it is powered off. It also provides secure management access to each server 308 once it is up and running.

In an embodiment, server manager 208a includes two components—an optional hardware component that has the ability to power the server on/off and to communicate with the boot loader 208b during the power on process; and a software component that runs either on this hardware or on the DSAP system 102 control console to act upon commands from load manager 206. In such an embodiment, the software component is designed to be portable between hardware platforms, but may require custom development for certain drivers.

After a server 308 has finished booting and is fully operational, a DSAP system 102 management process is started on the server to communicate with server manager 208a. In an embodiment, communications can occur over the server's serial console or a secure network connection. This interface is used for several functions: to provide secure access, similar to a port concentrator, to the server's console via the management LAN; to provide secure monitoring facilities via the management LAN; and to provide the interface by which server manager 208a can gracefully shut down the server 308 prior to powering it off.

In an embodiment, a single instance of a software-only server manager 208a can manage any number of servers 308. In an alternate embodiment, a hardware server manager 208a can manage a fixed number of servers 308 based upon its available resources (e.g., 15 or more servers). In sum any implementation of the server manager 208a must have access to an adequate communications channel between itself and the boot loader 208b running on the server(s) 308 being managed.

D. Server Monitor

Server monitor 204 continuously monitors all servers 308 within data center 200 in order to alert any server failures or server pool 212 under- or over-load conditions. In an embodiment, server monitor 204 includes two processes—an emitter process and a collector process.

The emitter process executes on each server 308 to monitor the health, load, and response time of the server. The collector process, in an embodiment, executes on the control console where the emitter process reports to the collector process using two periodic signals. The first periodic signal, in an embodiment, is a short "heartbeat" interval (e.g., every second), and provides a "heartbeat signal," the absence of which alerts the collector process to a server failure. The second periodic signal, in an embodiment, is a user-configurable longer interval (e.g., anywhere from every five seconds to every five minutes), and provides a full load update. All communications between the emitter and collector processes occur over a secured management channel provided by server manager 208a.

When the collector process detects a missing heartbeat signal, it sends a notification to load manager 206 alerting it to a potential server failure.

From the load reports that it receives from each server 308, the collector process of server monitor 204 builds an image of the active server pools 212. It automatically detects when a server is added to or removed from a server pool 212 and adjusts its accounting appropriately. At periodic intervals it calculates the average load across each server pool 212 and forwards these values to load manager 206.

In an embodiment, to ensure that server monitor 204 is properly robust and scalable for very large server deployments, its collection system can be tiered. To ensure complete fault-tolerance and redundancy, emitter processes can be configured to report to multiple collector processes.

In an embodiment, because different applications have different concepts of "load", the emitter process includes an API by which data center 200 administrator can tailor its load assessment for each application executing on a server 308.

E. Load Manager

Load manager 206 is key DSAP system 102 component for allocating servers 308. It receives a variety of inputs including: direct commands from the administrator via the GUI or CLI, schedules server allocation events via CLI scripts, heartbeat failure notifications from server monitor 204, server pool 212 load statistics from server monitor 204, as well as server allocation rules and policies (or criteria) configured by the data center administrator.

To allocate a server 308, load manager 206 issues commands to repository manager 210 in order to assign an instance 306 of the proper class 304 to the server 308. To power a server 308 off or on, load manager 206 issues commands to the server's server manager 208a. To ensure that the network infrastructure is properly configured for the server's new personality, load manager 206 issues commands to the infrastructure controller 202. This includes: configuring the VLANs for the switch ports associated with the server 308, as well as adding the server 308 to the appropriate server pools 212 managed by the load balancers 216.

If properly configured, load manager 206 will automatically allocate and power on a replacement server 308 upon the detection of a failed server 308. It can also automatically allocate servers following the rules and policies established by the administrator in response to a server pool 212 under- or over-load condition. It can even preemptively shutdown servers and re-allocate them to higher priority tasks.

V. Server Provisioning Operation

Through the use of software repository 300, DSAP system 102 divides server provisioning and allocation into two separate tasks.

Referring again to FIG. 3, DSAP system 102 provisions a server 308 by generating a fully configured, bootable instance 306 of the appropriate server class 304, complete with network address assignments, VLAN configuration, load balancing configuration, etc. Provisioning n instances 306 of a server class 304 provides DSAP system 102 with the capacity to run n servers 308 of the specified class 304, provided that sufficient server resources are available. To execute those instances, however, the required n number of servers 308 must first be allocated by assigning them an instance 306. In an embodiment, DSAP system 102 supports three instance types—independent, local and dependent instances.

An independent instance 306 contains an actual physical copy of all files in the master image 217, with the configuration files updated to provide a unique personality for the server. Because it consumes a significant amount of disk space, the independent instance is rarely used for production servers. It is most commonly used to generate a base snapshot for a new server class from an existing server class definition. The independent instance is stored on centralized storage (e.g., storage 218) and can be run by any available server 308.

A local instance 306 is an independent instance that is physically stored on the local storage attached to a server 308. Because the local instance physically resides with the server, it can only be run by that server and cannot be allocated elsewhere. The maximum number of local instances supported by a server is dependent upon the server type and its available local storage. (For example, due to MS DOS partitioning restrictions, a standard Intel® Pentium processor-based server can only support four local instances 306 per local disk drive.)

A dependent instance 306 contains copies of just those files necessary to boot the server 308 and provide it with a unique personality. The remainder of the image is shared with other dependent instances by referencing the read-only snapshot 302 containing the original files. The dependent instance is stored on centralized storage (e.g., storage 218) and can be executed by any available server 308. Because the dependent instance is mostly shared on a remote, read-only file system, use of the dependent instance provides: dramatically reduced storage requirements; the volume of data that must be backed-up is reduced by a similar amount and the process simplified because the data is centrally located; greatly simplified disaster recovery; faster instance generation than other server provisioning techniques; and servers are no longer vulnerable to security holes that rely on modifying critical system files (as the critical system files are mounted on a remote, read-only file system, they cannot be modified from server 308, even when running with administrative access).

DSAP system 102 can re-provision an entire data center 200 in the time that it takes to reboot servers 308 due to its unique approach of "virtualizing" the server 308. Virtualization is defined as the process of dividing a server's software image from the hardware required to run the image. A server's software image traditionally resides on a local disk drive and includes an operating system (including the kernel image), file systems, commands, utilities, programs, and scripts to operate and administer the server, application software, system or application data, and configuration information.

In an embodiment of DSAP system 102, a server image 217 can reside on NAS 218, a SAN, a distributed file system (DFS), or any other centralized data storage element. A centrally stored image 217 is not associated with any specific server 308 and can execute on any available server. Likewise, an available server 308 can execute any ready image 217, provided that the server's hardware is compatible with the image.

Like a traditional server, DSAP system 102 also supports storing images on servers' local storage. Unlike a traditional server, however, DSAP system 102 can support multiple images 217 on local storage and can rapidly switch the server 308 back and forth between any of these local images and any shared images on centralized storage 218 based upon the current needs of data center 200. Benefits to moving system image 217 to centralized storage include: changing a server's system image requires no changes at the server and can be done while the server is on-line; re-provisioning the server is as quick and simple as rebooting the server and pointing it to a different image; the complexity of managing a server pool 212 is greatly simplified by having system images 217 centrally located; and there is no need to copy data over the network, to synchronize multiple images, or to schedule updates for offline servers; centralized images significantly reduce the cost and complexity associated with backup and disaster recovery; and storage requirements 217 for server images can be reduced.

Most parts of a server's system image are read-only and identical from one server to the next. In the traditional local-storage model, each server has to have its own copy of the entire system image on its own local drive. In DSAP system 102, servers can share a single copy of the read-only portions of images 217 stored on NAS 218 or SAN. Local images 217, however, are bound to the attached server and cannot be shared amongst available servers.

VI. Server Allocation Operation

In an embodiment of the present invention, an administrator can manually allocate one or more servers 308 using the administrative interface or CLI, via the control console, to send the proper commands to load manager 206. Using either interface this involves a simple (manual) three-step procedure: (1) shutting down the particular server 308 if it is currently in use; (2) assigning the desired instance 306 to the server 308; and (3) powering up the server 308 so that it will run with the new instance 306. In such an embodiment, the entire procedure takes as long as rebooting the server. In an embodiment, when infrastructure controller 202 is installed within the DSAP system 102 of the data center 200, network infrastructure 214 surrounding the server 308 is automatically provisioned when an instance 306 is assigned to a server 308.

In another embodiment of the present invention, an administrator can schedule allocation of one or more servers 308 by using CLI instructions in a script file executed on a pre-determined schedule from the control console.

In yet another embodiment, DSAP system 102 can be configured to automatically respond to server failures that are detected by server monitor 204. DSAP system 102 can also be configured to automatically respond to server pool under- and over-load conditions that are a reported by server monitor 204.

Load manager 206 filters the reports that it receives from server monitor 204 to remove duplicate reports, verifies the correctness of the information, and then takes appropriate action based upon the configured rules and policies configured by the administrator. Potential actions include: Ignoring the condition; Alerting the data center 200 staff via an alarm, email, pager, etc.; Provisioning and powering up a replacement for a failed server 308; Powering off a server in an under-loaded server pool 212; provisioning and powering on a server 308 to join an over-loaded server pool 212; Provisioning and powering on a replacement collector process; Provisioning and powering on a set of servers 308 to replace those taken off line by a failed server manager 208a; and Installing itself as the primary load manager when the controlling load manager 206 fails.

In an embodiment, load manager 206 makes server allocation decisions by following the policies configured by an authorized administrator. The failure policy can be set for a specific server class 304, instance 306, server 308 or server pool 212. The supported policies, in an embodiment of the present invention, are described in Table 1 below.

TABLE 1

| Policy | Description |
| --- | --- |
| Ignore | The server failure is ignored with the assumption that a replacement will be powered on only if needed to meet the configured load policy. |
| Restart | N attempts are made within a specified time window to restart the failed server. If the configurable restart count is exceeded, load manager 206 continues with the alternate failure policy. |
| Replace | The failed server 308 is replaced with another server 308 executing any free instance 306 of the same server class 304. |
| Takeover | The instance 306 associated with the failed server 308 is moved to a ready server 308, which is then powered on to take over. |

Load manager 206 allocates servers 308 and images 217 to handle under- and over-loaded server pools 212 based upon the rules specified for each service or application. These rules are specified by the DSAP system 102 administrator and, in an embodiment, include those described in Table 2 below.

TABLE 2

| Rule | Description |
| --- | --- |
| Min # of Servers | The minimum number of servers to have online at any time for the application; |
| Max. # of Servers | The maximum number of servers to have online at any time for the application; |
| Application Relative Priority | The relative priority of the application relative to the other applications in the data center 200; higher priority applications can steal servers 308 from lower priority applications when the data center as a whole is overloaded. |
| Min. Acceptable Avg. Load | The minimum acceptable average load for a server pool 212. If the load on the pool falls below this threshold, servers 308 will be powered off and returned to the free pool. |

TABLE 2-continued

| Rule | Description |
| --- | --- |
| Max. Acceptable Avg. Load | The maximum acceptable average load for a server pool. If the load on the pool exceeds this threshold, servers will be allocated from the free pool, provisioned with an appropriate system image, and powered on so that they can join the pool. |
| Server Class Relative Cost | The relative cost associated with using a specific server class 304 for an application. |
| Server Relative Cost | The relative cost associated with using a server from a specific virtual cluster for an application |

In an embodiment, in order to facilitate the management and control of automated server allocation, DSAP system 102 utilizes the concept of the "virtual cluster." A virtual cluster is a collection of servers 308 (or server pools 212) and their respective instances 306 that are grouped together to provide one or more service or application. Load manager 206 controls the number of servers 308 actively powered on within a virtual cluster and controls the assignment of instances 306 to those servers 308 in order to meet the load requirements for each application. Applications can be constrained to specific clusters. Each cluster can have a different "cost" associated with providing the application. This gives the administrator excellent control over where servers 308 are allocated in order to provide an application.

Figure 4B:
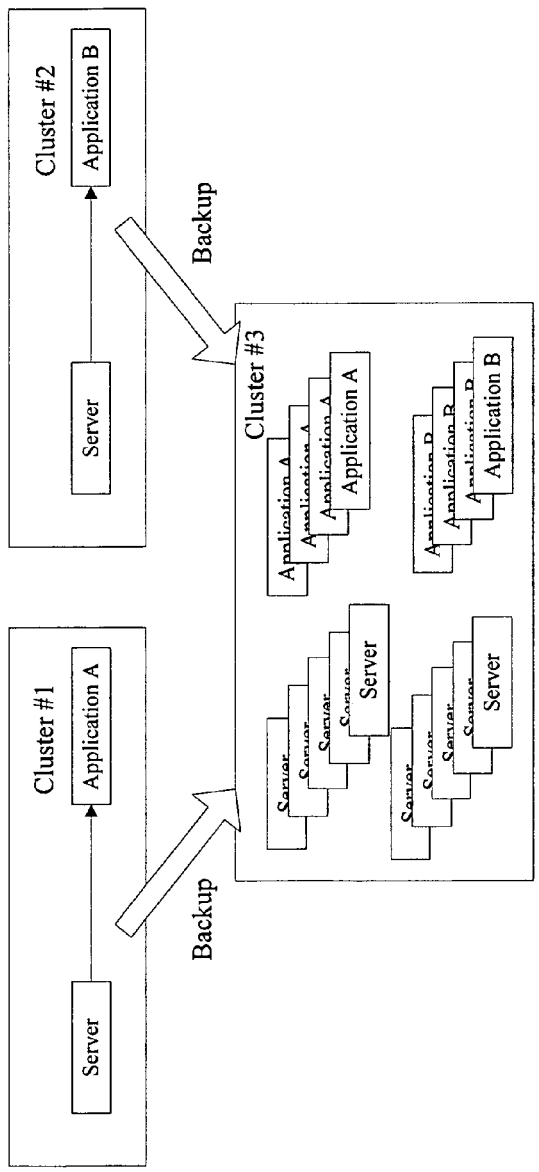
FIGS. 4A–B are block diagrams illustrating the use of clusters in one embodiment of the present invention.
Figure 4A:
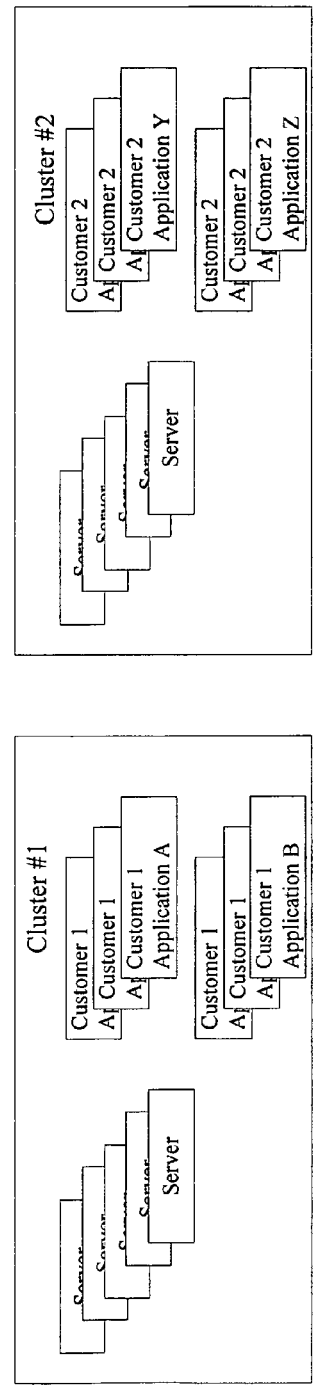

The virtual cluster is a flexible tool for meeting diverse objectives. Referring to FIG. 4A, a block diagram shows how virtual clusters can be used to separate servers 308 and instances 306 by ownership. All of the servers 308 and instances 306 owned by Customer1 are isolated in Cluster1. All of the servers and instances owned by Customer2 are in Cluster2. Referring to FIG. 4B, a block diagram shows resources separated by function, using a single, large cluster as a backup for multiple primary clusters.

Figure 6A:
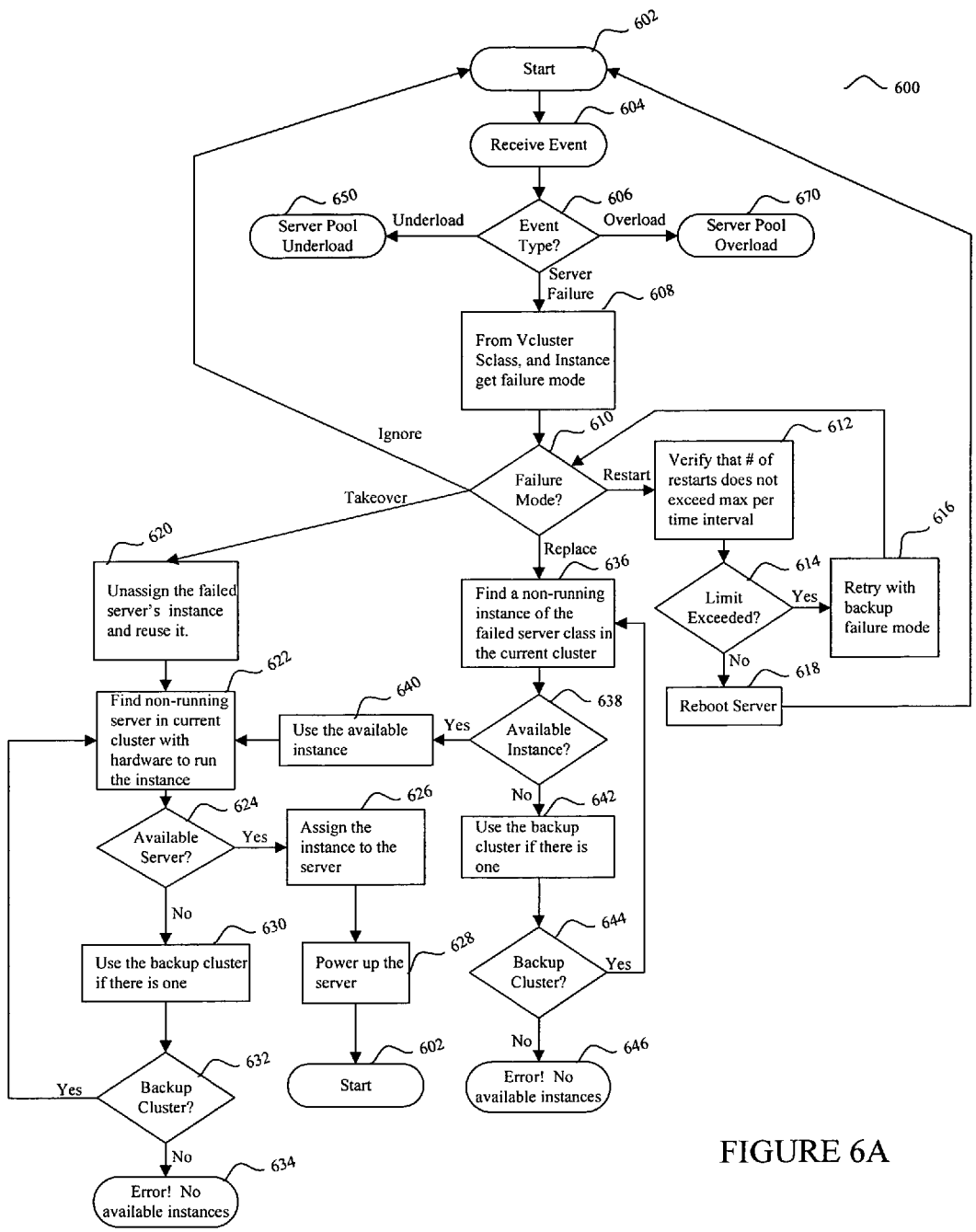
FIGS. 6A–6B, are flowcharts illustrating an automated server allocation process according to an embodiment of the present invention.

Referring to FIG. 6A, an automated server allocation process 600, according to an embodiment of the present invention is shown. As will be appreciated by one skilled in the relevant art(s), process 600, in an embodiment, can be executed in an endless loop fashion by load manager 206. In such an embodiment, process 600 begins at step 602, with control passing immediately to step 604.

In step 604, load manager 206 receives an event from server monitor 204 (in the form of a heartbeat or load management signal).

Figure 6B:
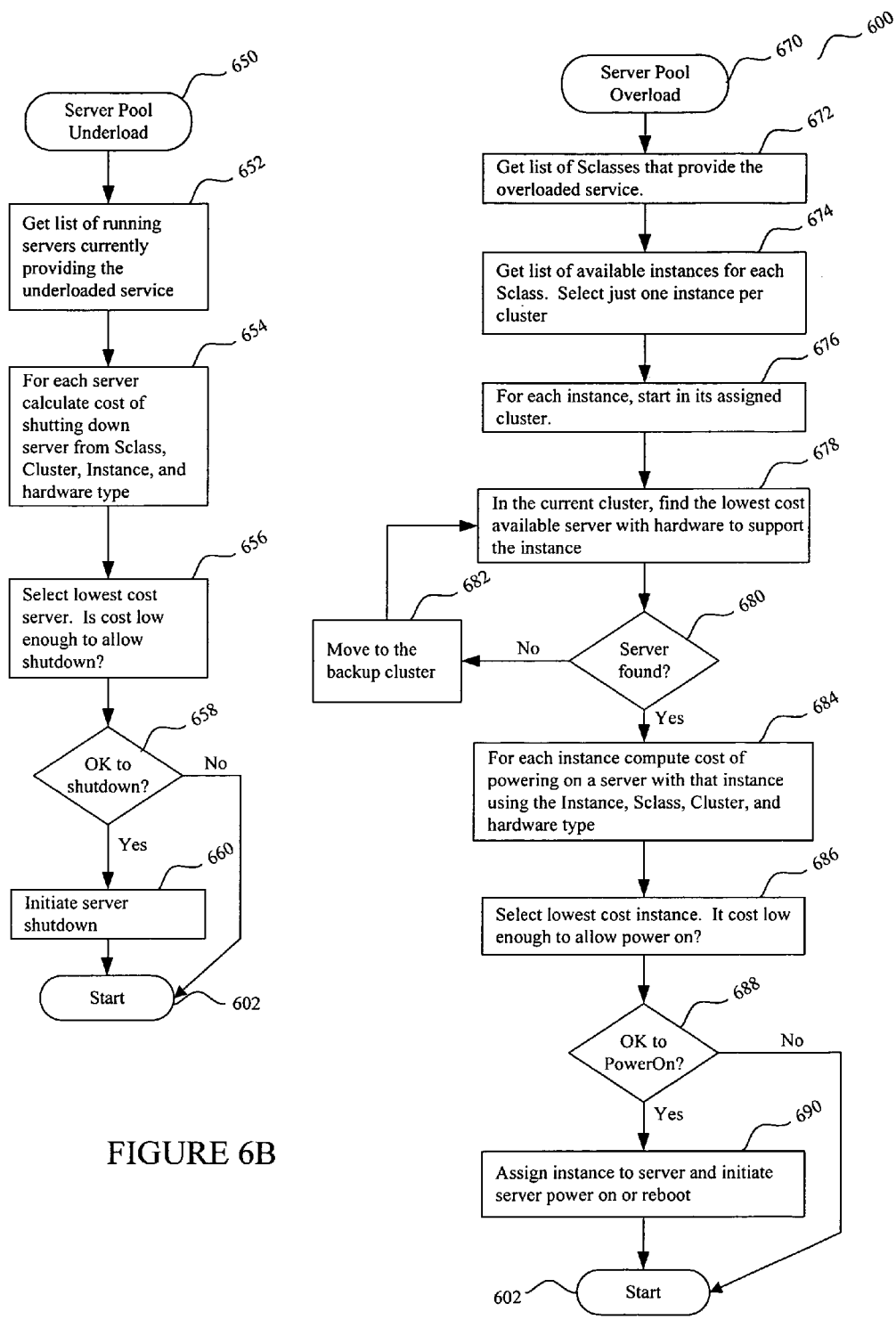

In step 606, process 600 determines the type of event received in step 604. If the event is a "server pool underload", process 600 proceeds to step 650 to handle such an event (as shown in FIG. 6B and described in detail below). If the event is a "server pool overload", process 600 proceeds to step 670 to handle such an event (as shown in FIG. 6B and described in detail below). If the event is a "server failure", process 600 proceeds to step 608 to handle such an event. In step 608, load manager 206 consults the policies (i.e., the failure modes of Table 1) pre-configured for the relevant virtual cluster, server class 304, and instance 306 relevant to the event was received in step 604.

In step 610, load manager 206 determines if the failure mode was previously set by an administrator to "Ignore". If so, process 600 returns to step 602 (i.e., the start of the execution loop) as indicated in FIG. 6A (see Table 1).

If step 610, determines that the failure mode was previously set by an administrator to "Restart", process 600 proceeds to step 612.

In step 612, load manager 206 checks the previously-set value of N (the maximum number of attempts to restart as set by the data center 202 administrator). Step 614 then determines if this maximum N number has been exceeded. If so, step 616 changes the failure mode to the previously-set alternate failure mode (see Table 1) and returns to step 610. If not, load manager 206 sends a command to the relevant server manager 208a to reboot the relevant server 308. Process 600 then returns to step 602 (i.e., the start of the execution loop) as indicated in FIG. 6A. If step 610, determines that the failure mode was previously set by an administrator to "Takeover", process 600 proceeds to step 620.

In step 620, load manager 206 unassigns the instance 306 of the failed server 308. In step 622, load manager 206 locates another server 308 in the relevant cluster which is available and able (in terms of hardware configuration) to run the instance 308 unassigned in step 620. In step 624, process 600 determines if step 622 was successful. If so, step 626 assigns the previously-unassigned instance 306 to the newly-identified server 308. The new server 308 is then powered up by the relevant server manager 208a in step 628 and process 600 then returns to step 602 (i.e., the start of the execution loop) as indicated in FIG. 6A.

If step 624 determines that step 622 was not successful, process 600 determines if there is an assigned backup cluster in step 630. If step 632 determines there is a backup cluster, process 600 returns to step 622 in order to identify an available server within the identified backup cluster. If step 632 determines there is not a backup cluster, process 600 issues an error (e.g., a message to the control console) in step 634 indicating that the "Takeover" failure policy could not be implemented.

If step 610, determines that the failure mode was previously set by an administrator to "Replace", process 600 proceeds to step 636.

In step 636, process 600 attempts to locate an unassigned instance 308 having the same server class 304 as the failed server 308. Step 638 then determines if step 636 was successful. If so, process 600 proceeds to step 640. In step 640, the unassigned instance 306 having the same server class 304 as the failed server 308 is identified and process 600 then attempts to assign it to an able and available server 308 within the cluster via steps 622–634 as described above.

If step 638 determines that step 634 was not successful, process 600 proceeds to step 642. In step 642, process 600 determines if there is an assigned backup cluster. If step 644 determines there is a backup cluster, process 600 returns to step 636 in order to identify an available server 308 within the identified backup cluster. If step 644 determines there is not a backup cluster, process 600 issues an error (e.g., a message to the control console) in step 646 indicating that the "Replace" failure policy could not be implemented.

Returning to step 606, if the event received in step 604 is a "server pool underload", process 600 proceeds to step 650 to handle such an event. Control then immediately passes to step 652.

Referring to FIG. 6B, in step 652, load manager 206 compiles a list of all servers 308 currently executing the under-loaded service (i.e., all servers 308 having a server class 304 containing the relevant snapshot(s) 302 that comprise the service) that caused the "server pool underload" event.

In step 654, load manager 206 calculates the costs of commanding the relevant server manager 208 to power off each server identified in step 652. This is done by load manager 206 based on a "Server Relative Cost" policy previously set by a data center 200 administrator (see Table 2) for each respective server 308.

In step 656, load manager 206 selects the lowest of the costs calculated in step 654 in order to determine if this cost is low enough (based on a pre-set criteria—threshold—specified by a data center 200 administrator) to justify expending such cost to power off the server 308 associated with this lowest cost. If step 658 determines such cost is low enough, load manager 206 commands the relevant server manager 208a to power off such server 308 in step 660. Then, or if step 658 determines such cost is not low enough, process 600 returns to step 602 (i.e., the start of the execution loop) as indicated in FIG. 6B.

Returning to step 606, if the received event is a "server pool overload", process 600 proceeds to step 670 to handle such an event. Control then immediately passes to step 672.

In step 672, load manager 206 compiles a list of all server classes 304 that are capable of providing the overloaded service (i.e., all server classes 304 containing the relevant snapshot(s) 302 that comprise the service).

In step 674, load manager 206 compiles a list of all available instances 308 for each server class 304 identified in step 672.

In step 676, a sub-loop of process 600 is started where for each instance 306 identified in step 674, steps 678–680 and 684–690 are performed within the cluster of the relevant instance 306.

In step 678, load manager 206 attempts to find available and able servers 308, and then identifies which has the lowest cost (based on a pre-set "Server Relative Cost" criteria specified by a data center 200 administrator) among those found.

In step 680, process 600 determines if step 678 was successful. If so, process 600 proceeds to step 684. In step 684, load manager computes the cost of powering on the identified server 308 using the identified server instance 306. This cost calculation is based upon pre-set cost criteria specified by a data center 200 administrator for each server 308, server class 304, instance 306 and cluster (see, e.g., Table 2).

In step 686, load manager 206 selects the lowest of the costs calculated in step 684 in order to determine if this cost is low enough (based on a pre-set criteria specified by a data center 200 administrator) to justify expending such cost to power on the server 308 associated with this lowest cost. If step 688 determines such cost is low enough, load manager 206 assigns the identified instance 306 to the identified server 308 and then commands the relevant server manager 208a to power on such server 308 in step 690. Then, or if step 688 determines such cost is not low enough, process 600 returns to step 602 (i.e., the start of the execution loop) as indicated in FIG. 6B.

Returning to step 680, if step 678 was not successful, process 600 proceeds to step 682. In step 682 process 600 repeats steps 678-690 for any assigned backup cluster. (If there is no assigned backup cluster, although not shown in FIG. 6B, process 600, in an embodiment, may issue an error—e.g., a message to the control console—in step 682 indicating that the "server pool overload" event could not be handled.)

VII. Example Implementations

Figure 5:
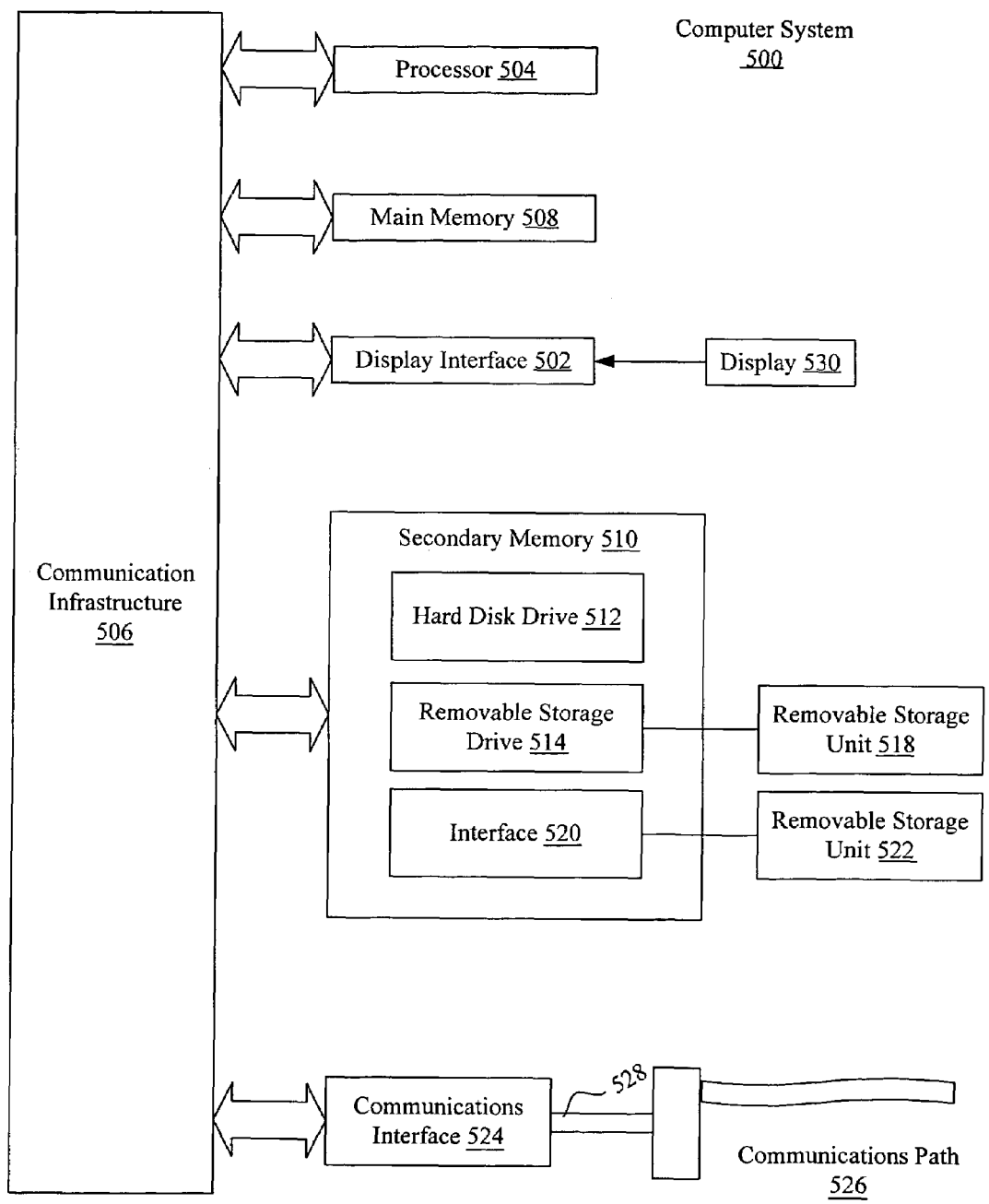
FIG. 5 is a block diagram of an exemplary computer system useful for implementing the present invention.

Generally, as will be appreciated by one skilled in the relevant art(s) after reading the description herein, the present invention (i.e., DSAP system 102 and/or any components(s) or function(s) thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 500 is shown in FIG. 5. Computer system 500 includes one or more processors, such as processor 504. The processor 504 is connected to a communication infrastructure 506 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from the communication infrastructure 506 (or from a frame buffer not shown) for display on the display unit 530.

Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518, represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528 which maybe electronic, electromagnetic, optical or other signals capable of being received by communications interface 524. These signals 528 are provided to communications interface 524 via a communications path (e.g., channel) 526. This channel 526 carries signals 528 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 514, a hard disk installed in hard disk drive 512, and signals 528. These computer program products provide software to computer system 500. The invention is directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

More specifically, repository 300 may consist of one or more storage devices 218 employing a variety of technologies such as Network Attached Storage (NAS), Storage Area Networks (SAN), Distributed File System (DFS), or any other technology for providing centralized storage. In an embodiment, repository 300 can simultaneously support any number of diverse storage element technologies.

Repository manager 210 may be implemented in hardware, software, or a combination thereof. In an embodiment, it manages the installation and life-cycle maintenance of software packages, the server provisioning process, the allocation of server images, and the software life-cycle management process. As will be apparent to one skilled in the relevant art(s) after reading the description herein, the specific embodiment of repository manager 210 may depend upon its implementation technology and the technology employed for repository 300.

With respect to server manager 208a, it must be able to reboot a server 308 or otherwise cause it to reload its system image. This involves powering the server 308 off and on. In alternate embodiments, server manager 208a achieves this control over the server 308 through any possible means, such as: via an external device that physically switches the power to the server on and off; exercising capabilities built directly into the server 308 itself; or sending commands to a management system built into or otherwise provided for the server 308.

While any server 308 is running, server manager 208a maintains a secure communications channel with the server in order to perform management functions according to the present invention. This communication channel may be via a serial connection to the server, a network connection to the server, or any other communications channel supported by the server 308.

The purpose of the server monitor 204 is to alert load manager 206 to server failures and server pool underload and overload conditions. In alternate embodiments, this can be implemented using any reliable, real-time mechanism for gathering the information including: any mechanism for directly monitoring the servers 308 and analyzing the retrieved data; using the results of some other monitoring or management process; retrieving the information from some other infrastructure component that detects these conditions such as a TCP/IP (or other network) load balancer.

In an embodiment, load manager 206 controls all aspects of provisioning and allocating servers 308a–n based upon the direct commands that it receives from administrators or the events and conditions that it senses across data center 200. It may be implemented using hardware, software, or a combination thereof and may be implemented in one or more computer systems or other processing systems. As described herein, load manager 206 relies upon other DSAP system 102 components to receive server status information and affect provisioning and allocation changes. Thus, its specific embodiment will depend upon the implementation of these other components.

As described herein, infrastructure controller 202 is responsible for configuring the network infrastructure surrounding a server to provide secure, limited access to those resources required by the server and its applications. An embodiment will depend upon the means used to affect configuration of the components of the network infrastructure 214–216, which includes but is not limited to: logging into such component as an administrator and issuing commands directly to such components using a serial connection; logging into such components as an administrator and issuing commands directly to such components using a secure network connection; and/or issuing machine-oriented commands directly to such component using some technology such as XML.

VIII. Conclusion

It should be understood that the figures, which highlight the functionality and other advantages of DSAP system 102, are presented for example purposes only. The architecture of the present invention is sufficiently flexible and configurable such that users may utilize system 102 in ways other than that shown in the figures.

While various embodiments of the present invention have been described above, it should be understood that they have been presented by way of example and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A system for providing dynamic server allocation and provisioning within a data center, wherein the data center includes a plurality of servers connected via a communications network, the system comprising:
- a storage element for storing a plurality of server images, the plurality of server images being available for the plurality of servers;
- a server manager capable of assigning one of the plurality of server images stored in the storage element to each of the plurality of servers, and capable of controlling the power of each of the plurality of servers;
- a plurality of boot loaders, each boot loader residing on one of the plurality of servers, each boot loader being capable of receiving commands from the server manager to associate at least one of the plurality of server images with at least one of the plurality of servers; and
- a server monitor capable of receiving a heartbeat signal and a load measurement signal periodically from each of the plurality of servers via the communications network, and capable of reporting the heartbeat signal and the load measurement signal to the server manager;
- wherein the server manager is able to allocate and provision the plurality of servers using the heartbeat signal according to a set of pre-determined criteria in response to the load measurement signal received from each of the plurality of servers,
- wherein the at least one of the server images is associated with the at least one of the plurality of servers by instructing the boot loader to load an operating system kernel on at least one of the plurality of servers and connect the system kernel to a root file system image associated with the at least one of the server images.

2. The system of claim 1, further comprising:
- a server manager capable of exchanging messages with each of the plurality of boot loaders, the messages assisting the plurality of boot loaders in associating at least one of the plurality of server images with at least one of the plurality of servers.

3. The system of claim 2, wherein the messages exchanged between the server manager and the plurality of boot loaders are Dynamic Host Configuration Protocol (DHCP) messages exchanged via the communications network.

4. The system of claim 1, further comprising:
- a repository manager capable of aggregating a plurality of application software snapshots in order to form at least one server image, and capable of storing the at least one server image on the storage element thereby making the at least one server image available to at least one of the plurality of servers.

5. The system of claim 4, wherein the plurality of application software snapshots are stored on the storage element so that a single copy of each of the plurality of application software snapshots is able to be shared among the plurality of server images.

6. The system of claim 4, further comprising:
- a control console having a graphical user interface (GUI) configured to allow a user to create the at least one server image from a subset of the plurality of application software snapshots.

7. The system of claim 1, wherein the server monitor comprises:
- an emitter, residing on each of the plurality of servers, the emitter being capable of generating the heartbeat signal and the load measurement signal; and
- a collector, residing on a control console, the collector being capable of receiving the heartbeat signal and the load measurement signal from the emitter via the communications network.

8. The system of claim 1, further comprising:
- an infrastructure controller capable of receiving commands from the server manager to configure switch ports on network switching equipment connected to a network interface on each of the plurality of servers.

9. The system of claim 1, wherein the storage element comprises a storage area network (SAN) device, a network attached storage (NAS) device, and/or a distributed file system (DFS), or a combination of two or more thereof.

10. The system of claim 1, wherein each of the plurality of system images is a bootable system image and includes a root file system, a kernel, and at least one executable software application.

11. The system of claim 1, wherein each of the plurality of servers is a virtual server residing on a single physical server and the server manager is capable of resizing partitions on the single physical server upon receiving commands from the server manager.

12. A system for remotely controlling a booting of a plurality of servers connected via a communications network within a data center, the system comprising:
- a plurality of server images available to the plurality of servers, the plurality of server images being stored externally to each of the plurality of servers;
- a plurality of boot loaders, each boot loader corresponding to one of the plurality of servers and each boot loader being capable of associating the plurality of server images with their respective server; and
- a server manager, located remotely from each of the plurality of servers, the server manager being capable of exchanging messages with each of the plurality of boot loaders via the communications network;
- wherein the server manager is configured to direct actions of each of the plurality of boot loaders to access at least one of the plurality of server images and to associate the at least one of the plurality of server images with corresponding one of the plurality of servers by instructing the boot loader to load an operating system kernel on at least one of the plurality of servers and connect the system kernel to a root file system image associated with the at least one of the server images;
- wherein a first server image associated with a first server is able to be reconfigured to account for differences between the first server and a second server, so that the first server image is able to be properly loaded and executed on the second server at any time.

13. The system of claim 12, wherein the messages exchanged between the server manager and the plurality of boot loaders are Dynamic Host Configuration Protocol (DHCP) messages exchanged via the communications network.

14. The system of claim 12, wherein at least one of the plurality of boot loaders resides in a flash memory of their respective server.

15. The system of claim 12, wherein at least one of the plurality of boot loaders is accessible to their respective server via the communications network.

16. The system of claim 12, wherein at least one of the plurality of boot loaders is accessible to their respective server via a serial line.

17. The system of claim 12, wherein at least one of the plurality of boot loaders is accessible to their respective server via a local storage element.

18. The system of claim 12, wherein each of the plurality of system images is a bootable system image and includes the root file system, the operating system kernel, and at least one executable software application.

19. The system of claim 12, wherein the plurality of server images comprises: a storage area network (SAN) device; a network attached storage (NAS) device; and/or a distributed file system (DFS).

20. The system of claim 19, further comprising:
a repository manager capable of aggregating a plurality of application software snapshots in order to form at least one server image, and storing the at least one server image on the storage network device.

21. The system of claim 20, wherein the plurality of application software snapshots are stored on the storage element such that a single copy of each of the plurality of application software snapshots is able to be shared among the plurality of server images.

22. The system of claim 21, further comprising:
a control console having a graphical user interface (GUI) configured to allow a user to create the at least one server image from a subset of the plurality of application software snapshots.

23. The system of claim 12, wherein each of the plurality of servers is a virtual server residing on a single physical server.

24. A method for remotely managing server images for a plurality of servers connected via a communications network, the method comprising:
storing a plurality of server images on a storage element, wherein the storage element is external to the plurality of servers and accessible via the communications network;
loading a plurality of boot loaders onto each of the plurality of servers, wherein each of the plurality of boot loaders is capable of associating the plurality of server images with their respective server; and
executing each of the plurality of boot loaders wherein each of the plurality of boot loaders exchanges messages with an external server manager, the external server manager being capable of directing the actions of each of the plurality of boot loaders during the loading of one of the plurality of server images onto their respective server;
wherein the associating of the plurality of server images with their respective server includes instructing at least one boot loader in the plurality of boot loaders to load an operating system kernel on at least one of the plurality of servers and connect the operating system kernel to a root file system image associated with the at least one of the server images;
wherein a first server image associated with a first server is able to be reconfigured to account for differences between the first server and a second server, so that the first server image is able to be properly loaded and executed on the second server at any time.

25. The method of claim 24, wherein the storage element comprises a storage area network (SAN) device, a network attached storage (NAS) device, or a distributed file system (DFS), or a combination of two or more thereof.

26. The method of claim 24, wherein the messages exchanged between the external server manager and the plurality of boot loaders are Dynamic Host Configuration Protocol (DHCP) messages exchanged via the communications network.

27. The method of claim 24, wherein at least one of the plurality of boot loaders resides in a flash memory on its respective server.

28. The method of claim 24, wherein each of the plurality of system images is a bootable system image and includes the root file system, the operating system kernel, and at least one executable software application.

29. A method for dynamic server allocation and provisioning among a plurality of servers connected via a communications network, comprising:
storing a plurality of server images on a storage element, the plurality of server images being available to the plurality of servers;
associating at least one of the plurality of server images stored in the storage element to at least one of the plurality of servers;
powering on the at least one of the plurality of servers and associating the at least one of the plurality of server images with the at least one of the plurality of servers by loading an operating system kernel on at least one of the plurality of servers and connecting the operating system kernel to a root file system image associated with the at least one of the server images; and
receiving a heartbeat signal and a load measurement signal periodically from the at least one of the plurality of servers via the communications network, the heartbeat and the load measurement signal providing a status of the at least one of the plurality of servers,
wherein, upon detecting at least one of the plurality of servers failing based on the heartbeat signal, or according to a set of pre-determined criteria based upon the load measurement signal received from said at least one of the plurality of servers, a replacement server among the plurality of servers may be allocated, powered on, and provisioned.

30. The method of claim 29, wherein loading the at least one of the plurality of server images onto the at least one of the plurality of servers, further comprises:
installing a boot loader onto the at least one of the plurality of servers in order to facilitate loading of the operating system kernel on the at least one of the plurality of servers; and
configuring switch ports connected to the at least one of the plurality of servers.

31. The method of claim 29, wherein the storage element comprises: a storage area network (SAN) device, a network attached storage (NAS) device, or a distributed file method (DFS), or any combination of two or more thereof.

32. The method of claim 29, wherein each of the plurality of system images is a bootable system image and includes the root file system, the kernel, and at least one executable software application.

33. The method of claim 29, further comprising:
aggregating a plurality of application software snapshots in order to form at least one server image, and
storing the at least one server image on the storage element, thereby making the at least one server image available to the plurality of servers.

34. The method of claim 29, further comprising:
storing the plurality of application software snapshots on the storage element so that a single copy of each of the plurality of application software snapshots shared among said plurality of server images.

35. The method of claim 34, wherein the set of pre-determined criteria includes:
a minimum number of the plurality of servers being assigned and executing the at least one server image;
a maximum number of the plurality of servers being assigned and executing the at least one server image;
a minimum average of load measurement signals received from at least one of the plurality of servers being assigned and executing the at least one server image;

a maximum average of the load measurement signals received from the plurality of servers being assigned and executing the at least one server image;

a pre-assigned priority for each of said plurality of server images;

a pre-assigned costs for each of the plurality of servers, the costs being associated with the type of hardware configuration of each of the plurality of servers;

a pre-assigned costs for each of the plurality of servers, the costs being associated with the type of software configuration of each of the plurality of servers;

a pre-assigned costs for each of said plurality of server images;

a pre-assigned costs for each of the plurality of servers, the costs being associated with each servers respective location within the communications network; or a pre-assigned costs for each of the plurality of servers, said costs being associated with each servers respective ownership, or a combination of two or more thereof.

36. A computer program product comprising a computer storage medium having control logic stored therein for causing a computer to remotely managing server images for a plurality of servers connected via a communications network, said control logic comprising:

a first computer readable program code for causing the computer to store a plurality of server images on a storage element, wherein the storage element is external to the plurality of servers and accessible via the communications network;

a second computer readable program code for causing the computer to load a plurality of boot loaders onto each of the plurality of servers, wherein each of the plurality of boot loaders is capable of associating one of said plurality of server images with their respective server; and a third computer readable program code for causing the computer to invoke each of the plurality of boot loaders, wherein each of the plurality of boot loaders exchanges messages with an external server manager capable of directing actions of each of the plurality of boot loaders by instructing at least one boot loader in the plurality of boot loaders to load an operating system kernel on at least one of the plurality of servers and connect the system kernel to a root file system image associated with the at least one of the server images;

wherein a first server image associated with a first server is able to be reconfigured to account for differences between the first server and a second server, so that the first server image is able to be properly loaded and executed on the second server at any time.

37. The computer program product of claim 36, wherein the messages exchanged between the external server manager and the plurality of boot loaders are Dynamic Host Configuration Protocol (DHCP) messages exchanged via the communications network.

38. A computer program prod act comprising a computer storage medium having control logic stored therein for causing a computer to perform dynamic server allocation and provisioning among a plurality of servers connected via a communications network, said control logic comprising:

a first computer readable program code for causing the computer to store a plurality of server images on a storage element, the plurality of server images being made available to the plurality of servers;

a second computer readable program code for causing the computer to assign at least one of the plurality of server images stored in the storage element to at least one of the plurality of servers;

a third computer readable program code for causing the computer to power on the at least one of the plurality of servers;

a fourth computer readable program code for causing the computer to load an operating system kernel on at least one of the plurality of servers and connect the system kernel to a root file system image associated with the at least one of the server images; and a fifth computer readable program code for causing the computer to receive a heartbeat signal and a load measurement signal periodically from the at least one of the plurality of servers via the communications network.

39. The computer program product of claim 38, further comprising:

a sixth computer readable program code for causing the computer to aggregate a plurality of application software snapshots in order to firm at least one server image, and store the server image on the storage element, thereby making the at least one server image available to the plurality of servers.

40. The system of claim 1, wherein at least a portion of the at least one of the server images is accessed by the boot loader via the operating system kernel loaded on at least one of the plurality of servers.

41. The system of claim 12, wherein at least a portion of the at least one of the server images is accessed by the boot loader via the operating system kernel loaded on at least one of the plurality of servers.

* * * * *